United States Patent [19]

Ljung et al.

[11] 4,153,317

[45] May 8, 1979

[54] INDIUM SEAL FOR GAS LASER

[75] Inventors: Bo H. G. Ljung; James G. Koper, both of Wayne, N.J.

[73] Assignee: The Singer Company, Little Falls, N.J.

[21] Appl. No.: 856,709

[22] Filed: Dec. 2, 1977

[51] Int. Cl.² .................. B23K 1/20; H01J 9/26
[52] U.S. Cl. .................... 316/19; 228/103; 228/121; 228/199; 134/1; 331/94.5 D; 316/20
[58] Field of Search .......... 228/103, 121, 199; 316/1, 17, 18, 19, 20; 134/1; 331/94.5 D

[56] References Cited

U.S. PATENT DOCUMENTS

| | | | |
|---|---|---|---|
| 3,153,839 | 10/1964 | Pakswer et al. | 228/121 |
| 3,740,110 | 6/1973 | Horton et al. | 316/21 X |
| 3,752,554 | 8/1973 | Thatcher | 316/19 X |
| 3,777,281 | 12/1973 | Hochuli | 331/94.5 D |
| 3,806,365 | 4/1964 | Jacob | 134/1 |

Primary Examiner—C. W. Lanham
Assistant Examiner—Kenneth J. Ramsey
Attorney, Agent, or Firm—T. W. Kennedy; L. A. Wright

[57] ABSTRACT

A method of forming a hard vacuum seal for use in a gas laser but not limited thereto. The method comprising the steps of polishing the surfaces to be joined together and then cleaning the surfaces with a plasma cleaner. Next, a force is applied to hold the surfaces in contact and then molten indium is applied onto the adjoining surface and allowed to cool in order to set the seal. In the method of forming the gas laser seal for fine alignment of the mirror surfaces, the seal is reheated, the mirrors realigned by sliding across the laser cavity while the laser is operative and the laser output is measured for maximum laser output. Then the seal is allowed to reset.

9 Claims, 9 Drawing Figures

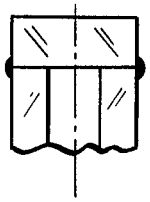
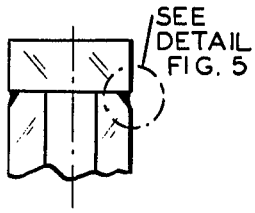
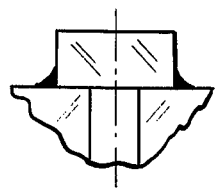
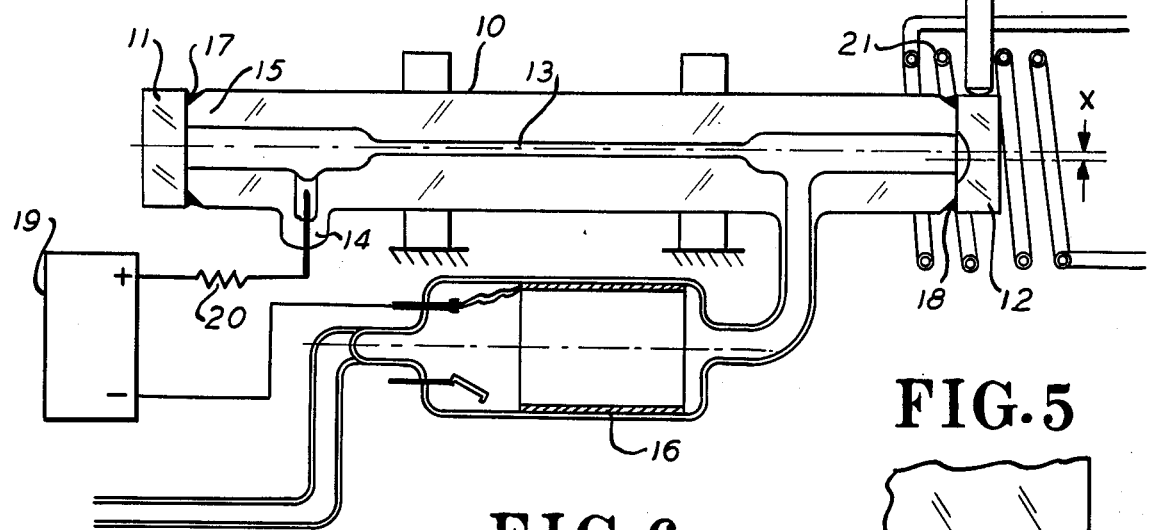
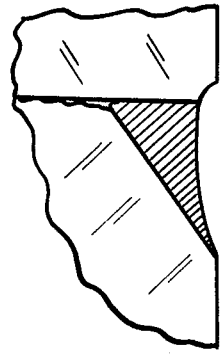
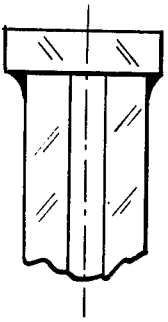
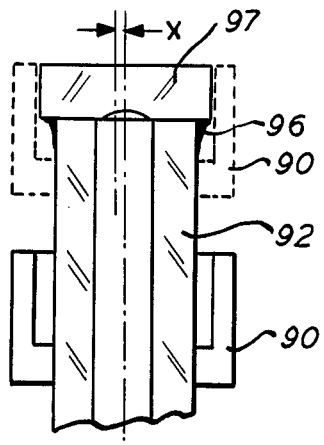
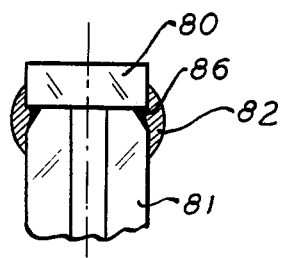
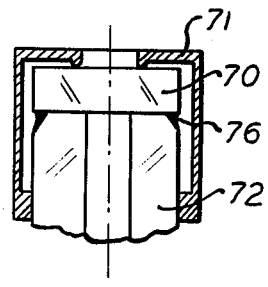

INDIUM SEAL FOR GAS LASER

THE PRIOR ART

U.S. Pat. No. 3,951,327 4/1976 Snow et al

U. Hochuli, "Review of Scientific Instruments" (Vol. 43, No. 8, August 1972)

A. Roth, "Vacuum Sealing Technique" page 266 (Pergamon Press 1966)

This invention is related to hard vacuum seals. More particularly, this invention is related to a method of providing a gas laser with a hard vacuum seal and to a method of providing fine adjustment of the laser mirror cavity while the laser is operating.

BACKGROUND OF THE INVENTION

Gas lasers are usually fabricated using one of two methods with respect to alignment. Both methods utilize a tilt or sideways alignment of the optical cavity comprised of the mirrors in order to align it with the gain tube in the laser. In a first method of passive coarse and fine alignment, the laser cavity is coarse aligned by the use of simple optical alignment methods such as autocollomation. Then the cavity is fine aligned by the use of the cavity as an interferometer, using an external monochromatic light source (e.g. a laser). The cavity is then sealed using, for example, optical contact or epoxy. The laser is then evacuated and filled. In a second method of passive coarse alignment and active fine alignment, the laser cavity is coarse aligned as in the first method. The sealing can be accomplished with several techniques such as optical contact, epoxy or glass frit. The laser is evacuated and filled. Fine alignment is next accomplished by deforming the support of one or both mirrors, for example, by using a metal tube with necked down section using set screws to accomplish the necessary adjustment while operating the laser. The laser is fine aligned to give maximum output power.

The disadvantage of the first method of passive coarse and fine alignment is that it is performed prior to activating the laser. This is necessary because the laser cannot be operated until the seal is fully cured. After the seal is made and the laser activated, it is not possible to realign the mirror. Therefore, the alignment is limited by the instability of the seal during its curing process. Passive alignment using an external light source is also more difficult than direct measurement of the light output of the activated laser. And since it is an indirect method, it is likely to be less accurate.

The disadvantage of the second method of passive coarse alignment and active fine alignment is chiefly high cost and lack of mechanical stability. The lack of mechanical stability arises from the fact that the metal in the necked down section, usually made of fully annealed Kovar, has to be plastically deformed. It is also difficult to finely align the mirror with set screws having a coarse thread compared with the desired fine alignment that usually has to be done within a few arc seconds tilt of the mirror. There is also a safety hazard in adjusting the metal part since it is generally used as the anode for operating the laser. The adjusting screws will be at a high voltage potential.

The main disadvantage with epoxy seals is due to outgassing and water permeability. both of these characterisitcs tend to limit a laser's life length. Consequently, there is a movement away from this type of seal in the manufacture of lasers. Another problem that affects an epoxy seal is temperature limitation. Epoxy usually cannot be heated higher than approximately 110° C. before decomposition. Strain and shrinkage due to complete curing affect the mirrors. There is also a gross mismatch in thermal expansion that affects this type of seal.

Although there is a movement in the field of lasers to hard (i.e. hard vacuum) seals and, more specifically, toward glass frit seals, it does not come without problems. High temperature, approximately 300° C., is necessary to make the seal. This seal has to be made in air, because of two reasons. First, the mirror degrades both by dissociation of oxygen from the coating when heated in oxygen deprived atmosphere and by crazing of the coating. Second, the glass frit usually contains lead oxides that reduce to free lead if heated without oxygen. Thus, no active fine alignment with the laser operating is possible, at least not by sliding the mirror while heating it. Also, a frit seal needs quite exact match of thermal expansions, further limiting the choice of the glass frit. Usually the glass frit has bad flow properties making even a coarse alignment a problem. Also, most solder glasses devitrify after heating for a short time, making yield and adjustment a problem. The glass frit seal doesn't bond to the mirror coatings. Therefore, it is necessary to either restrict the coated surface or remove it by, for instance, sand blasting from the seal area.

Optical contact seals are very expensive and can, therefore, be used only on very special lasers such as ring laser gyroscopes, where the added cost is relatively smaller than for ordinary gas lasers. Optical contact seals are expensive because of the requirements of good surface finish, scratch and dig 10—5, and requirement of flatness, $\lambda/10$. Contact cannot be made on curved surfaces. It is further not possible to align the laser actively, for instance, by sliding on a curved mirror back and forth because of leaks and because the vacuum inside the laser would make the mirror stick onto its contact surface.

None of the seals described above afford the laser manufacturer the possibility to readjust a laser cavity. Because these seals do not provide a means for readjusting the laser cavity, the yield in production is low. It is, therefore, necessary when using these seals to combine anyone of the above seals with a metal bellows or metal tube with a necked down section in order to accomplish fine adjustment.

BRIEF DESCRIPTION OF THE INVENTION

The present invention teaches both the method of fabrication a novel seal, as well as the method of readjusting the seal after it has been fabricated permitting the fine alignment of the laser while it is operating. The invention describes the application to a linear laser. However, the invention is applicable to other types of optical instruments (e.g. ring laser gyroscope) as well as other uses requiring hard vacuum seals.

The method comprises the steps of polishing and cleaning the mirror and laser cavity surfaces which are to be joined. Cleaning is to be accomplished with a plasma cleaner. Next, a force is applied to hold the mirror and laser cavity in contact and molten indium is rubbed onto the exterior of the contacting surfaces and allowed to cool in order to set the seal. For fine alignment, the seal is reheated, the mirror realigned by sliding across the laser cavity while the laser is operative in order to obtain maximum laser output.

Accordingly, it is an object of this invention to provide a method for making a hard vacuum hermetic bonded seal for a laser cavity and a method for fine adjustment of the laser by reheating the seal while the laser is operative.

This and other objects, features and advantages of the present invention will become apparent from the following description taken in conjunction with the accompanying drawings wherein:

FIG. 1 is a cross sectional view of a linear laser using the hard vacuum seal of the invention, FIGS. 2-6 illustrate different methods of applying the seal to the mirror and laser surfaces, and FIGS. 7-9 illustrate different methods of providing a sleeve to protect the seal.

Turning to FIG. 1, a linear gas laser 10 is shown. Conventionally, mirror 11 may be flat with a dielectric high reflectivity mirror coating and mirror 12 may have a somewhat lower reflectivity coating. Mirror 12 is the output mirror. The gain section of the tube, or capillary 13, must be carefully aligned to the mirror cavity. An anode 14 and a cathode 16 are usually employed to excite the gain medium consisting of a gas or a gas mixture filling the laser cavity.

To fabricate a laser in accordance with this invention, mirrors 11 and 12 are placed onto the laser tube 10 by hand and then the laser is evacuated. The vacuum holds mirrors 11 and 12 in place. Coarse adjustment of mirror 12 is done using conventional optical means such as an autocollimator. Usually the flat mirror 11 does not use any further alignment other than that accomplished by machining the end 15 of laser tube 10 perpendicular to the capillary 13. The seals 17 and 18 are next fabricated using indium or an indium alloy such as Cerroseal 35 manufactured by Cerro de Pasco Corporation, New York, New York. The seals 17 and 18 are made in the following manner. The surfaces to be sealed are highly polished and then cleaned in a plasma chamber (of the type manufactured by LFE Corporation, Mass.) with continuous throughput of 3% $O_2$ and 97% He mixture and a rf power setting of 300 watts for 4 minutes, in order to effect a good cleaning of the surfaces to be sealed which is extremely important. In making the seal, the parts are first assembled and when the parts are in their almost final position while evacuating the laser, indium is applied with a heated soldering iron, applying the indium onto the outside of the seal. The application of vacuum while the seal is being fabricated causes the molten indium to be drawn right up into the seal area preventing any dead air space from being trapped in the seal. Virtual leaks within the seal are thus eliminated as shown in the detail of FIG. 5. Using this method, the molten indium stops at the edge of the seal area and does not penetrate the interface between the parts to be joined. The seal can be rapidly checked for leaks by utilizing a leak detector as the means of producing the vacuum. It usually takes only two minutes to fabricate a leakproof seal.

It is believed that the in-line use of a leak detector, while fabricating the seal is not only novel, but that it provides a rapid and reliable method of manufacturing seals for lasers. Moreover, this fabrication of a hermetically sealed laser using only materials compatible with a hard vacuum permits the mirrors to remain in the position to which they were initially adjusted. In this method of fabrication, when the laser is filled and still attached to the vacuum system, it will lase as soon as the plasma is excited by means of power supply 19 and anode resistor 20.

Because the indium is not drawn into the area underneath the mirror when heated under vacuum, it is possible as well as practical to reheat the seal using, for example, induction coil heater 21 until the indium of seal 18 is again molten. Now while the laser is operating, fine adjustment to mirror 12 can be done by sliding it sideways by, for example, by means of the micrometer screw 22 (noting that the vacuum provides sufficient force to hold mirror 12 in place). In an actual setup, usually four micrometer screws (not shown) are utilized to facilitate a two axis adjustment. This fine adjustment of mirror 12 is a simple procedure consuming only a few seconds of time. Mirror 12 is moved sideways by sliding it until maximum output power from the laser is obtained. The induction heater is then turned off and seal 18 is allowed to cool and reset.

The laser is then ready for exhaustion, getter firing and final fill. No further fine adjustment is necessary. High stability of the mirror attachment is achieved from the time the mirror is finally adjusted because of the very localized heat required to remelt the seal. This precludes any thermal changes in the supporting structure. The temporal stability and the thermal stability are good because the seal does not actually support the mirror. The mirror is held very gently, yet firmly onto the tube by the atmospheric pressure. FIGS. 2, 3, 4 and 6 are cross-sectional views illustrating alternate ways in which the seal may be applied.

In circumstances where the laser mirrors are not protected from handling, it is necessary to provide additional support to the seal using a metal sleeve which is epoxied around the mirror as shown in FIGS. 7, 8 and 9. A very soft epoxy can be used for this purpose in order not to cause mechanical stresses. FIG. 7 shows a clamp 71 covering seal 76, mirror 70 and laser tube 72 to provide protection and mechanical spring load. FIG. 8 shows epoxy 82 or similar substance applied to the seal 86, bonding mirror 80 and laser tube 81. FIG. 9 shows a seal protective device 90 to cover seal 96, mirror 97 and laser tube 92.

From the foregoing, a hard vacuum hermetic seal has been described. The invention embodies both a seal and a means of actively fine adjusting the seal whereas prior art seals cannot be actively fine adjusted but must be used in conjunction with a flexible adjustable support. Moreover, the invention facilitates the fabrication of lasers with long life and high fabrication yield. The disclosed indium seal is compatible with requirements to obtain a hard vacuum. Unlike epoxy seals, it has no gas or water penetration and thus it offers a laser with unlimited storage life. The yield in fabrication is higher than with using glass frit seals. This is mainly because of difficult process control with regards to the frit seal devitrification process and because the high temperature involved tends to degrade the mirrors.

While particular embodiments of the invention have been shown and described, modifications may be made, and it is intended in the following claims to cover the embodiments which fall within the true spirit and scope of the invention.

We claim:

1. The method of making a hard vacuum seal between surfaces to be sealed comprising:
   polishing the surfaces to be sealed together,
   placing said surfaces in a plasma chamber, cleaning said surfaces to be sealed with a plasma cleaner consisting of 3% $O_2$ and 97% He, subjecting said surfaces while in said chamber to rf power of 300 watts for a predetermined time, applying a vacuum to said surfaces to hold said surfaces in contact, applying molten indium onto said contacting surfaces, avoiding penetration of said molten indium into the interface between said surfaces, and allowing said indium to set forming said seal.

2. The method of claim 1 comprising:

forming a covering to protect said seal.

3. In a gas laser having a set of mirrors, the method of making a hard vacuum seal of the mirrors to the laser cavity comprising:

polishing the surfaces of said mirrors and said laser cavity which are to be sealed, placing said mirrors and said laser in a plasma chamber, cleaning said surfaces of said mirrors and laser cavity with a plasma cleaner consisting of 3% $O_2$ and 97% He while subjecting said surfaces of said mirrors and laser cavity to rf power of 300 watts for 4 minutes, attaching said mirrors to said laser cavity and holding said mirrors in place under a force of vacuum connected to said laser cavity, applying heated indium onto the outside contacting surfaces of said mirrors and said laser cavity, avoiding penetration of said heated indium into the interface between said mirrors and laser cavity, and allowing said indium to cool and said seal to set.

4. The method of claim 3 comprising:

filling said laser cavity with lasing material, exciting said laser by means of a source of power, measuring the power output of said laser as a coarse measurement, reheating said seal and sliding said mirror across said laser cavity while said laser is operating to maximize said laser power output, and removing said heat from said seal to allow said seal to reset at maximum laser power output.

5. The method of claim 4 comprising:

forming a covering to protect said seal.

6. The method of claim 5 comprising:

measuring said laser cavity for leakage with an in-line leak detector while forming said seal.

7. In a gas laser having a high reflectivity mirror and a lower reflectivity mirror, the method of making a hard vacuum seal of the mirrors to the laser cavity and the method of fine adjustment of the mirrors to the laser cavity comprising:

polishing the surfaces of said mirrors and said cavity which are to be sealed.

placing said mirrors and said cavity in a plasma chamber, cleaning said surfaces of said mirrors and cavity with a plasma cleaner consisting of 3% $O_2$ and 97% He, subjecting said mirrors and said cavity while in said chamber to rf power of 300 watts for four minutes, attaching said mirror to said laser cavity and holding said mirrors in place under force of a vacuum connected to said laser cavity, forming a seal at said surfaces by applying heated indium thereon, applying said indium onto the outside of said seal, avoiding penetration of said heated indium into the interface of said surfaces and allowing said indium to cool and said seal to set, filling said laser cavity with a lasing material, exciting said laser by means of a source of power, measuring the power output of said laser, reheating said seal and sliding at least one of said mirrors radially while said laser is operating to obtain maximum laser power output, and removing said heat from said seal allowing said seal to reset at maximum laser power output.

8. The method of claim 7 comprising:

forming a covering to protect said seal.

9. The method of claim 8 comprising:

measuring said laser cavity for leakage with an in-line leak detector while forming said seal.

* * * * *